United States Patent Office 3,001,163
Patented Sept. 19, 1961

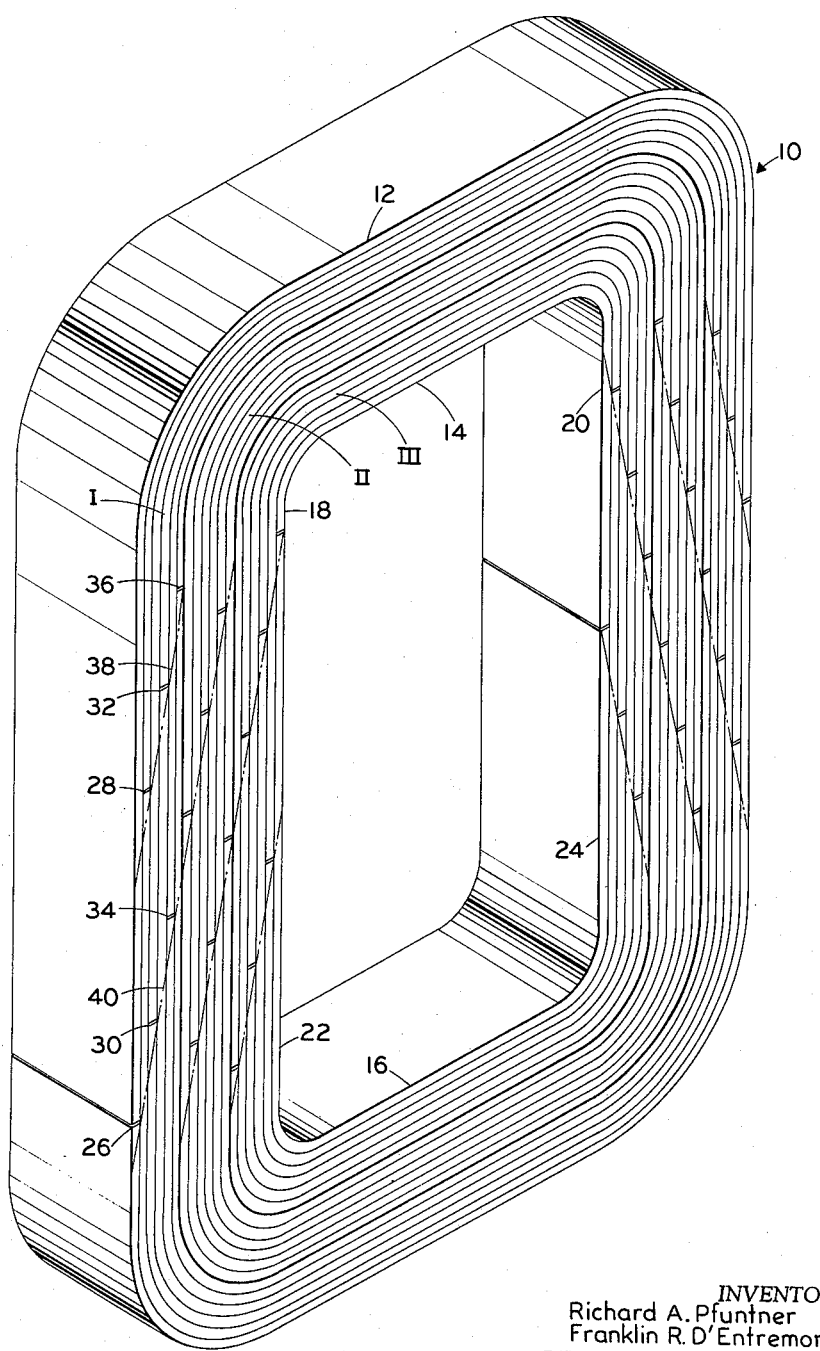
INVENTORS
Richard A. Pfuntner
Franklin R. D'Entremont
BY M. W. Goodwin
Their Attorney

3,001,163
MAGNETIC CORE CONSTRUCTION
Richard A. Pfuntner, Lynn, and Franklin R. D'Entremont, Lynnfield, Mass., assignors to General Electric Company, a corporation of New York
Filed Nov. 19, 1958, Ser. No. 774,977
2 Claims. (Cl. 336—217)

This invention relates to an improved construction for laminated magnetic cores for use with stationary electrical induction apparatus.

In the construction of laminated magnetic cores for stationary electrical induction apparatus one of the problems which is encountered is that of magnetic saturation and core losses occurring because of the joints in the laminated material constituting the magnetic core. An illustration of this problem is exemplified in the case of magnetic cores constructed of rolled strip magnetic material such as silicon strip steel. In a known construction of such cores, a plurality of strips or laminates of the magnetic material are formed as by bending or punching to provide a plurality of pairs of substantially U-shaped laminate sections which are then assembled with the ends of the U-shaped laminate sections being arranged in end-to-end fashion to form a closed loop core having a hollow center. The respectively adjoining ends of the laminate sections are, during assembly of the core, positioned as close together as possible, it being desirable to provide a perfect butt joint. However, under practical manufacturing procedures it is not possible to obtain perfect butt joints and still maintain a reasonable manufacturing cost. Accordingly, normally the joints between laminate sections are in the form of separated butt joints.

As will be apparent, the reluctance across a separated butt joint is many times that which would be encountered if the joints were perfect butt joints. In order to minimize the increased reluctance in the core, it is a known practice to stagger the joints in next adjacent laminates so as to provide an overlapping unjointed portion of laminated material on each side of each joint. In this manner, the flux in any one laminate may transfer to the unjointed portions of next adjacent laminates rather than being forced to pass across the gap formed by the joint. The flux density in these overlapping unjointed portions adjacent each joint will, of course, be greater than if the joint were not present. It is, therefore, desirable to locate a minimum number of joints in any one plane extending at right angles to the flux, or, in other words, in alignment laterally of the core, in order to maintain this increase in flux density below that which would result in core saturation. Further, the reluctance of the overlapping portions will be inversely related to their length or, in other words, to the spacing of the joints in next adjacent laminates. It is thus desirable to space next adjacent joints as far apart as practically possible in order to minimize the proportionate increase of the reluctance of the overlapping portions as a result of an inadvertent increase in gap length which will effectively reduce the length of the overlapping portions.

While some prior art constructions have provided staggered joints to minimize the number of joints in any plane extending laterally of the core to minimize the core saturation problem, such prior art constructions have not at the same time obtained the necessary spacing along the core of the joints in next adjacent laminates in order to minimize the proportioned increase in reluctance in the magnetic circuit due to increases in gap length inadvertently occurring during manufacture, while at the same time maintaining reasonably low manufacturing cost.

It is, therefore, the object of this invention to provide a new and improved staggered joint construction for laminated magnetic cores wherein the joint pattern in the core will provide for the necessary minimum increase in flux density in any one plane extending laterally of the core due to the location of joints in that plane, while at the same time will provide an optimum spacing of joints in next adjacent laminates to minimize any increase in reluctance in the magnetic circuit due to varying gap length, while at the same time maintaining the over-all size of the core within design limits, and while at the same time maintaining the cost of manufacture at a reasonably low level.

To accomplish the object of this invention there is provided a laminated magnetic core in which a plurality of groups of laminates are used, with each laminate group comprising a plurality of laminates or layers of magnetic material each including a pair of U-shaped sections joined end to end in separated butt joints. The joints between respectively associated pairs of laminate sections in the core are arranged in a particular novel pattern to accomplish the object of this invention, which pattern is characterized by the offsetting of the joints in each laminate group first in one direction and then in the opposite direction along the core leg, the core leg being formed by the legs of the U-shaped laminate sections, and with this pattern being repeated similarly in each laminate group, and with the joint patterns of each laminate group being disposed substantially side by side and extending over substantially the entire joint locatable portion of the core leg.

The detailed structure and advantages of this invention will be more fully apparent from the following detailed description taken in connection with the accompanying drawing, in which is shown a perspective view of a laminated magnetic core in which the laminate section joints are arranged in accordance with this invention.

Referring to the drawing, there is shown a laminated magnetic core 10 which is formed of a plurality of strips 12 of suitable magnetic material, such as rolled silicon steel. The strips or laminates 12 may be, in accordance with known practices, formed by stamping or punching in the case of flat laminates or by shearing and bending as in the case of the laminates in the specific embodiment shown. Each laminate 12 comprises an upper U-shaped section 14 and a lower U-shaped section 16 having legs 18, 20 and 22, 24, respectively. The laminates may be, as shown in the drawing, a single thickness of material or, as will be more usual in the interest of economy of manufacture, each U-shaped section may comprise a plurality of members of like configuration. The upper U-shaped sections are arranged in oppositely facing fashion from the lower U-shaped sections, and the ends of the legs of the upper and lower U-shaped sections are disposed closely adjacent each other to provide a separated butt joint. As will be apparent, the legs of the U-shaped sections form the legs of the core.

As will be further apparent, the joint locatable portion of each leg of the core is something less than the actual length of the core leg, inasmuch as a substantial amount of material, as exemplified by the laminate leg 18 of the section 14, is necessary in the forming of the U-shaped members in the interest of manufacturing economy and ease of handling and assembly.

In accordance with the invention, the laminates of the core have been divided for jointing purposes into a plurality of groups I, II and III. In the specific embodiment shown, three laminate or layer groups have been used, with each group comprising six laminations or layers. However, it will be understood that a different number of laminate groups with a different number of laminates per group could be utilized while still remaining within the teaching and scope of this invention and obtaining the advantages thereof. The one limitation in the number of laminate groups, which will be apparent, is that there be at least two such groups.

With reference to the laminates in group I, in the left-hand core leg as viewed in the drawing, there are provided joints 26, 28, 30, 32, 34, and 36. In accordance with the invention, these joints in next adjacent laminates are spaced or offset longitudinally of the core leg, first in one direction and then in the opposite direction, and the joints in alternate or every other lamination are progressively spaced longitudinally of the leg in the same direction. The longitudinal spacing of the joints in the next adjacent and alternate laminates is preferably such that there are provided in each laminate group two sets of joints, exemplified in the drawing by joints 28, 32, 36 and 26, 30, 34, respectively. The sets of joints preferably lie on a pair of lines 38, 40, respectively, which lines extend obliquely of the core leg, with the oblique line extending through the upper set of joints 28, 32, 36 being parallel with the oblique line extending through the lower set of joints 26, 30, 34. The joint pattern extends over substantially the entire joint locatable portion of the core leg, thus providing for a given number of joints in a laminate group, the maximum spacing longitudinally of the core leg between the joints in next adjacent laminates while at the same time providing for the spacing longitudinally of the core leg between the joints in alternate laminates. It will, of course, be particularly noted that no two joints in the laminate group lie in the same plane extending laterally of the core leg.

The joint pattern in laminate groups II and III is generally similar to that of laminate group I to the extent that there are provided two sets of joints in each laminate group with the sets of joints being arranged respectively on a pair of parallel lines extending obliquely of the core leg and with the joints in next adjacent and alternate laminates being offset longitudinally of the core leg in the same manner as described in connection with laminate group I. As may be seen, the joint patterns in each laminate group are disposed substantially side by side, and the patterns in laminate groups II and III, as in the case of group I, also extend over substantially the entire joint locatable portion of the core leg. It is further preferred that the joint patterns of next adjacent laminate groups be offset longitudinally of the core so as to provide, as is shown with respect to groups I and II and groups II and III, that corresponding joints in next adjacent laminate groups will not be aligned in a plane extending laterally of the core leg.

In order to achieve the maximum longitudinal progression between the joints in alternate laminates throughout the width of the core leg, it is preferred that the oblique line defining the upper set of joints in laminate group II be aligned with the line 40 defining the lower set of joints in group I, and correspondingly that the line defining the lower set of joints in group II be aligned with the line defining the upper set of joints in group III. Thus, the joint locating oblique lines in each laminate group are offset longitudinally of the core leg relative to the joint locating oblique lines in the next adjacent laminate group in a direction opposite the progression of joints in alternate layers in each laminate group. In this manner the desired longitudinal progression between joints in alternate laminates will be preserved not only within each laminate group but also as between the last two laminates in any one group and the first two laminates in the succeeding group.

As should be apparent from the foregoing description taken in connection with the drawing, the use of the joint pattern of this invention effectively increases the joint locatable length of the core leg in direct proportion to the number of laminate groups in each core leg. For example, in order to obtain the same longitudinal progression between the joints of next adjacent and alternate laminates in the core leg of the embodiment shown simply by extending the pattern in laminate group I through the remaining laminate groups, the length of the core leg would have to be increased to approximately three times that shown. Thus, by the use of this invention, a substantial decrease in material required is obtained inasmuch as the core leg length need be only approximately one-third the length required in a core construction in which the same longitudinal progression between the joints in next adjacent and alternate layers is provided by means of an extended simple staggered joint pattern, while at the same time the desired improvement in magnetic efficiency and reduction of core losses is obtained.

The specific joint pattern illustrated in the accompanying drawing is the preferred pattern; however, it must be realized that in the interest of economy of manufacture, the tolerances in the lengths of the laminates comprising the core must be maintained at a reasonable level, as also must be the tolerances on the thickness of strip used for the laminates. Accordingly, in actual practice the arrangement of joints may not fall within the exactness of the pattern ideally desired. However, it has been found that with a joint pattern characterized by the alternate offsetting of the joints in adjacent laminates in opposite directions along the core together with the offsetting of the joints in alternate laminates longitudinally of the core in the same direction in a progressive manner and coupled with the arrangement of the joint patterns in the respective laminate groups substantially side by side and extending over substantially the entire joint locatable portion of the core leg, the joints in each laminate group will, within reasonable limits, tend to lie in a pair of parallel lines extending obliquely of the core leg and the core performance will be satisfactorily improved.

Thus, while the specific pattern disclosed is desirable and may be obtained through the use of very close manufacturing tolerances, in the interests of economy of manufacture, the exact alignment of the joints in any one laminate group as well as the alignment of joints in one laminate group with the joints in the next adjacent laminate group need not be strictly adhered to in order to reasonably obtain the advantages of and remain within the teachings and scope of this invention. The scope of this invention is intended to be limited only by the appended claims, which are considered to include all structure which shall logically fall within the language of the claims.

What we claim as new and desire to secure by Letters Patent of the United States is:

1. In a laminated magnetic core of the type including a plurality of superposed groups of laminates, each laminate group comprising a plurality of layers of magnetic material, each layer comprising a respectively associated pair of substantially U-shaped sections each having a pair of leg portions with the U-shaped sections of each respectively associated pair thereof being arranged with the leg portions thereof in end to end relation to form a closed loop with a separated butt joint between the ends of each pair of respectively associated legs, the jointed legs of said U-shaped members forming the legs of the core; the joints in each core leg being staggered relative to each other along the core leg in a pattern characterized by the joints in each laminate group being arranged so that the joints in next adjacent layers are alternately offset relative to each other first in one direction and then in the opposite direction along the core leg, so that the joints in alternate layers are offset longitudinally of the core leg progressively in the same direction, and so that the joints in each laminate group are arranged in two sets of joints with the joint sets respectively tending to lie in a pair of parallel joint locating lines extending obliquely of the core leg, and by the joint pattern in next adjacent laminate groups being disposed substantially side by side with the joint locating oblique lines in each laminate group being offset longitudinally of the core leg relative to the joint locating oblique lines in the next adjacent laminate group and in a direction opposite the direction of progression of the joints in alternate layers of each laminate group, and by the joint pattern in each laminate group extending over substantially the entire joint locatable portion of the core leg.

2. In a laminated magnetic core of the type including a plurality of superposed groups of laminates, each laminate group comprising a plurality of layers of magnetic material, each layer comprising a respectively associated pair of substantially U-shaped sections each having a pair of leg portions, with the U-shaped sections of each respectively associated pair thereof being arranged with the leg portions thereof in end to end relation to form a closed loop with a separated butt joint between the ends of each pair of respectively associated legs, the jointed legs of said U-shaped sections forming the legs of the core; the joints in each core leg being staggered relative to each other along the core leg in a pattern characterized by the joints in each laminate group being arranged so that the joints in next adjacent layers are alternately offset relative to each other first in one direction and then in the opposite direction along the core leg, so that joints in alternate layers are offset longitudinally of the core leg progressively in the same direction, and so that the joints in each laminate group tend to lie in a pair of parallel lines extending obliquely of the core leg, and by the joint patterns in next adjacent laminate groups being disposed substantially side by side with the patterns in next adjacent laminate groups being offset longitudinally of the core leg relative to each other so as to offset along the core leg the joints in one laminate group from the corresponding joints in the next adjacent laminate group, and by the joint pattern in each laminate group extending over substantially the entire joint locatable portion of the core leg.

References Cited in the file of this patent

UNITED STATES PATENTS

| 2,456,457 | Somerville | Dec. 14, 1948 |
| 2,477,350 | Somerville | July 26, 1949 |

FOREIGN PATENTS

| 1,111,252 | France | Oct. 26, 1955 |